United States Patent [19]
Wan et al.

[11] Patent Number: 5,354,359
[45] Date of Patent: Oct. 11, 1994

[54] HYDROMETALLURGICAL PROCESS FOR THE RECOVERY OF PRECIOUS METAL VALUES FROM PRECIOUS METAL ORES WITH THIOSULFATE LIXIVIANT

[75] Inventors: Rong-Yu Wan; K. Marc LeVier; Richard B. Clayton, all of Salt Lake City, Utah

[73] Assignees: Newmont Gold Co.; Newmont Mining Corp., Denver, Colo.

[21] Appl. No.: 94,791
[22] Filed: Jul. 28, 1993

Related U.S. Application Data

[63] Continuation-in-part of Ser. No. 861,563, Apr. 1, 1992.
[51] Int. Cl.$^5$ .......................... C22B 3/42; C22B 11/08
[52] U.S. Cl. ...................................................... 75/744
[58] Field of Search ........................................... 75/744

[56] References Cited

U.S. PATENT DOCUMENTS

| | | | |
|---|---|---|---|
| 4,070,182 | 1/1978 | Genik-Sas-Berezowsky et al. | 75/103 |
| 4,269,622 | 5/1981 | Kerley, Jr. | 75/103 |
| 4,369,061 | 1/1983 | Kerley, Jr. | 75/103 |
| 4,654,078 | 3/1987 | Perez et al. | 75/118 R |
| 4,723,998 | 2/1988 | O'Neil | 75/101 R |
| 4,738,718 | 4/1988 | Bakshani et al. | 75/105 |
| 4,765,827 | 8/1988 | Clough et al. | 75/2 |
| 4,801,329 | 1/1989 | Clough et al. | 75/97 A |
| 4,816,235 | 3/1989 | Pesic | 75/744 |
| 4,902,345 | 2/1990 | Ball et al. | 75/118 R |
| 4,923,510 | 5/1990 | Ramadorai et al. | 423/29 |
| 4,925,485 | 5/1990 | Schulze | 75/744 |
| 5,127,942 | 7/1992 | Brierley et al. | 75/743 |
| 5,215,575 | 6/1993 | Butler | 75/744 |
| 5,236,492 | 8/1993 | Shaw | 75/744 |

FOREIGN PATENT DOCUMENTS

WO91/11539 8/1991 World Int. Prop. O.

OTHER PUBLICATIONS

Berezowsky, R. M. G. S. and Sefton, V. B., "Recovery of Gold and Silver from Oxidation Leach Residues by Ammoniacal Thiosulfate Leaching", Paper at the 108th AIME Annual Meeting, Feb. 18–22, 1979, pp. 1–17.

Tozawa, K., Inuf, Y. and Umetsu, T., "Dissolution of Gold in Ammoniacal Thiosulfate Solution," AIME/TMS paper Selection, Paper No. A 81–25, 1981, pp. 1–12.

Zipperian, D., Raghavan, S. and Wilson, J. P., "Gold and Silver Extraction by Ammoniacal Thiosulfate Leaching from a Rhyolite Ore", Hydrometallurgy, 19, 1988, pp. 361–375.

Hemmati, M., Hendrix, J. L., Nelson, J. H. and Milosavljevic, E. B., "Study of the Thiosulfate Leaching of Gold from Carbonaceous Ore and the Quantitative Determination of Thiosulfate in the Leached Solution", Extraction Metallurgy 1989 Symp., Inst. Min. Metall., London, 1989, pp. 665–678.

Gallagher, M. P. et al., "Affinity of Activated Carbon Towards Some Gold (I) Complexes", Hydrometallurgy, 25, 1990, pp. 305–316.

Langhans Jr., J. W., Lei, K. P. V. and Carnahan, T. G. "Copper-catalyzed Thiosulfate Leaching of Low-grade Gold Ores", Hydrometallurgy, 29, Jun. 1992, pp. 191–203.

*Primary Examiner*—Peter D. Rosenberg
*Attorney, Agent, or Firm*—Fred A. Keire; William J. Spatz

[57] ABSTRACT

A hydrometallurgical process for the recovery of precious metal values from refractory precious metal ore materials containing preg-robbing carbon by leaching with a thiosulfate lixiviant, the process comprising a. providing a body of particles and/or particulates of an ore material having precious metal values and preg-robbing carbonaceous components;
b. contacting the body of particles and/or particulates with a thiosulfate lixiviant solution at conditions conducive to the formation of stable precious metal thiosulfate complexes;
c. recovering the thiosulfate lixiviant from the body of particles and/or particulates after a period of contact which is sufficient for the lixiviant solution to become pregnant with precious metal values extracted from the ore material; and
d. recovering the precious metal values from the lixiviant solution.

In a preferred embodiment, the refractory ore materials are low grade precious metal ore materials.

46 Claims, 10 Drawing Sheets

HYDROMETALLURGICAL PROCESS FOR THE RECOVERY OF PRECIOUS METAL VALUES FROM PRECIOUS METAL ORES WITH THIOSULFATE LIXIVIANT

This is a continuation-in-part of co-pending application Ser. No. 07/861,563, filed on Apr. 1, 1992.

BACKGROUND OF THE INVENTION

The present invention relates to the hydrometallurgical recovery of precious metal values from refractory precious metal ores containing preg-robbing carbonaceous material.

Conventionally, precious metals have been extracted from ore materials by lixiviation or leaching with cyanide-containing solutions. It has been found however that some gold ores do not respond well to conventional lixiviation because of the presence of impurities that interfere with the leaching process. These ores are termed "refractory".

One common cause of the refractoriness of gold ores is organic carbonaceous matter that is associated with some deposits. This carbonaceous matter is believed to adsorb solubilized gold complexes from lixiviant solutions back into the ore. The adsorbed gold is not recovered, and remains with the ore material and is eventually carried off with the tailings, leading to poor gold recovery. This can be a very serious problem, as a small amount of carbonaceous matter can adsorb essentially all of the solubilized gold in an entire cyanide lixiviation circuit. This is sometimes referred to as poisoning the circuit. In other cases, the carbonaceous matter is believed to coat the gold, and thereby prevent the lixiviant solution from gaining access to it. In other words, carbon can "rob" precious metal values, and gold in particular, from the lixiviant solution that is "pregnant" therewith. This characteristic is referred to as "preg-robbing."

It is believed that the carbonaceous content that participates in preg-robbing comprises an activated carbon-type carbon material, long-chain hydrocarbons and organic acids, such as humic acid. See Sibrell, P. L. et al., *Spectroscopic analysis of Passivation Reactions for Carbonaceous Matter from Carlin Trend Ores*, GOLD 90 PROCESS MINERALOGY X, pp. 355-363 (1990). Adsorption of the gold lixiviant complex by carbonaceous material is very complicated, due to three major factors. First, the precise chemical and physical nature of the carbonaceous matter is difficult to define, and varies from one ore body to the next. Second, the mechanism by which the carbonaceous material adsorbs gold is still being investigated. Third, although it has been known for some time that preg-robbing carbonaceous material can be passivated, or treated so as not to adsorb gold, the mechanism by which this occurs is not fully understood.

Many procedures have been investigated in an effort to passivate or deactivate the preg-robbing potential of carbonaceous ores, but none have been entirely satisfactory when applied to low grade refractory ores. The procedures heretofore tried include roasting, kerosene pretreatment, flotation, aqueous chlorination, chemical oxidation and biological deactivation. The preferred approach for the recovery of previous metal values from preg-robbing carbonaceous ore materials has been to deactivate or remove the preg-robbing components in the ore material using one of the aforereferenced pretreatment techniques followed by lixiviation with cyanide-solution. Examples of such attempts can be found in U.S. Pat. No. 5,127,942 to Brierley et al. which describes the deactivation the preg-robbing carbonaceous component in refractory ores using a specific microbial consortium, followed by recovery of precious metal from the carbon-deactivated residue by cyanidation; U.S. Pat. No. 4,801,329 to Clough et al. which describes the use of a chemical oxidation pretreatment to enable a precious metal to be extracted from carbonaceous ores preferably by cyanidation. The deactivation of the preg-robbing carbonaceous components with chemical agents, such as taught by Clough, and with biological/biochemical agents, such as taught by Brierley, introduces additional expense and complexity to the processing of refractory ores materials.

Heretofore thiosulfate lixiviant has been suggested for recovering precious metals from difficult to treat ores. U.S. Pat. No. 4,654,078 to Perez et al. describes the use of copper-ammonium thiosulfate to recover precious metals from difficult-to-treat ores, especially those containing manganese and/or copper. The presence of copper and/or manganese contraindicates the use of cyanide solution leaching because such materials increase cyanide consumption. U.S. Pat. Nos. 4,369,061 and 4,269,622 to Kerley describe lixiviating with an ammonium thiosulfate leach solution containing copper to recover precious metals from difficult-to-treat ores, particularly those containing copper, arsenic, antimony, selenium, tellurium and/or manganese, and most particularly those containing manganese. U.S. Pat. No. 4,070,182 to Genik-Sas-Berezlosky et al. describes the recovery of gold from copper-bearing sulfidic material containing gold using a secondary leach with ammonium thiosulfate.

Nothing in the prior art has suggested that excellent precious metal recovery yields could be achieved from preg-robbing carbonaceous ores material, including low grade materials, without a pretreatment step to deactivate or remove the preg-robbing components in the ore material by using thiosulfate lixiviation under controlled conditions.

Despite the growing world-wide interest in recovering precious metals from carbonaceous ores, and substantial work which has been done to develop a viable technology for doing so, a fully satisfactory process for metal recovery from most carbonaceous ore materials has yet to be provided.

Therefore, it is an object of the invention to provide a process for recovering at least one precious metal from preg-robbing carbonaceous ore, without the necessity of first subjecting the preg-robbing carbonaceous ore to a pretreatment step to deactivate or remove the preg-robbing component of the ore.

A further object of the present invention is to permit the recovery of precious metals values from low grade precious metal refractory ore material, including material that has heretofore been considered waste.

Still further, the present invention has as a goal the recovery of precious metal values from refractory precious metal ore material, particularly such ore materials with low grade precious metal content, with improved economic and energy efficiency.

SUMMARY OF THE INVENTION

The present invention relates to a hydrometallurgical process for the recovery of precious metal values from refractory precious metal ore materials containing preg-robbing carbonaceous material comprising:

a. providing a body of particles and/or particulates of an ore material having precious metal values and a preg-robbing carbonaceous material content;
b. contacting the body of particles with a thiosulfate lixiviant solution at conditions conducive to the formation of stable precious metal thiosulfate complexes;
c. recovering the thiosulfate lixiviant solution from the body of ore material particles and/or particulates after lixiviant solution is pregnant with precious metal values extracted from the ore material;
d. recovering the precious metal values from the lixiviant solution.

The invention can be practiced on a batch or continuous basis. The contacting step can take place on a pad, with the ore material to be treated situated in a heap; or in a vat, tank or the like. The primary criterion for the contacting step is that the thiosulfate lixiviant solution achieve intimate contact with the precious metal containing ore material.

According to the invention, a refractory precious metal ore material containing preg-robbing carbonaceous material is reduced by means of crushing, grinding or like processing to a particle size that is advantageous for metallurgical liberation. The invention can be put into practice in several different processing schemes and the particle size selected depends on which processing scheme is selected.

In one embodiment of the invention precious metal values are extracted from preg-robbing carbonaceous ore material in a heap. The term "heap" is used to describe a static body of ore material. It applies to a mass of particles and/or particulates supported only at its base, such as a heap, etc., and also, if desired, to a mass of particles and/or particulates supported on its sides in which the ore material remains static such as being held in a confining vessel such as a column, vat, tank and the like—a form that is particularly advantageous for recirculating a lixiviant solution.

When ore material is processed in a heap it is preferably in the form of subdivided particles and/or particulates with 90% by weight being less than 2 inches in size, and preferably 70–80% by weight being less than 0.5 inch in size. By the term "particles" it is meant the individual particles found in ore material, such as run-of-the-mine ore; further, it is meant, ore particles formed after crushing. By the term "particulates" it is meant a body or shape that is built up from individual particles properly agglomerated. Since the process of the present invention is particularly amenable to low grade ores and to waste, particles need not be milled or ground, thereby reducing the capital and operating costs of the process of the present invention. If desired, particulates can be formed or made. One method for forming particulates is disclosed in U.S. Pat. No. 4,765,827 to Clough. Other conventional methods for forming particulates include extruding, pilling, tableting and the like.

To facilitate the recovery of precious metal values from ores that have a sulfidic sulfur content that also renders them refractory, any such sulfide content in the ore is preferably at least partially oxidized. Refractoriness in sulfidic ores is believed to be caused by very fine grain gold being encapsulated in sulfide minerals, such as pyrite, arsenopyrite or arsenian pyrite. In some cases, the gold occurs as substitutional impurity atoms in the sulfide mineral crystal lattice. The sulfides must therefore be completely, or at least partially, oxidized to allow lixiviant solution access to the gold. It is desirable that the sulfide content of such ores be decreased by about 40% or more. Suitable sulfide oxidation processes for refractory sulfidic precious metal ores are:

autoclaving,
chlorination,
nitric acid oxidation,
microbial oxidation (also known as biooxidation), or
roasting.

If sulfidic sulfur content of an ore material is treated by microbial or nitric acid oxidation, the ore material will be left with an acidic pH. In such cases, it is desirable to raise the pH of the ore to at least about 9 to enable the efficient recovery of precious metal values from the ore using thiosulfate lixiviation. This can be done by washing the ore material and/or treating it with an aqueous solution having a basic pH. Sodium carbonate, dilute ammonium hydroxide, lime and caustic are suitable bases.

Thiosulfate lixiviation of a static heap of ore material comprises passing thiosulfate lixiviant in solution through the heap under conditions selected to cause the thiosulfate to extract precious metal values from the ore material. After passing through the heap, the thiosulfate lixiviant becomes pregnant with extracted precious metals values. The pregnant lixiviant solution is recovered at the bottom of the heap and recirculated, either continuously or intermittently. Precious metal values are recovered from the lixiviant solution, preferably by means of precipitation. The recovery of precious metals from the lixiviant solution can be carried out either periodically or continuously. After the precious metal values are recovered from the lixiviant solution, the regenerated solution is recirculated to the static heap.

It has been found that when the lixiviation of carbonaceous preg-robbing ore material is conducted in accordance with the teachings of the present invention with respect to controlled thiosulfate concentration, lixiviant solution pH, oxidation/reduction conditions and ammonia concentration, as more fully described hereinafter, high precious metal recovery yields can be achieved even from low grade preg-robbing carbonaceous ore materials without pretreatment of the ore to deactivate or remove its preg-robbing component.

In an alternate embodiment of the invention, preg-robbing carbonaceous ore materials containing precious metal values are finely ground before being subjected to extraction of precious metal values using thiosulfate lixiviant. As described above with respect to the "static heap" process, it has been found that when thiosulfate lixiviant is used under controlled conditions, very good precious metal recovery yields can be achieved from ore materials containing preg-robbing carbonaceous material without a pre-treatment step to deactivate or remove the preg-robbing component.

Finely grinding ore material prior to subjecting it to thiosulfate lixiviation increases the surface area of the ore exposed to the lixiviating solution and achieves comparatively higher precious metal recovery from a given ore material with less thiosulfate lixiviant contact time. While higher precious metal recovery yield and shortened extraction time are obvious benefits of this approach, finely grinding an ore material imposes additional capital burdens. It has historically been justified only on higher grade ore materials. The selection between processing technology is generally made based on laboratory analysis of the refractory ore material.

Even though finely grinding refractory ore does tend to liberate precious metals which are occluded in sulfide components within ores having high sulfidic sulfur contents, processing to reduce the sulfide content of such ores is often necessary just as aforedescribed with respect to static heap processing. In such cases, it is within the scope of the present invention to subject the finely ground ore material to a pretreatment step to at least partially oxidize the sulfide sulfur in the ore material. Oxidation pretreatments for sulfide sulfur in finely ground ore material include microbial oxidation, nitric acid oxidation, chemical oxidation and autoclaving. None of these sulfur pretreatments deactivate or remove preg-robbing carbonaceous components in an ore material. As aforedescribed, if the sulfidic sulfur content of an ore material is treated by microbial or nitric acid oxidation, the finely ground ore material will be left with an acidic pH. In such cases, it is also desirable to raise the pH of the finely ground ore material to at least about 9 prior to contacting the ore material with thiosulfate lixiviant solution in the precious metal extraction step.

The finely ground preg-robbing ore, pretreated as aforedescribed, if necessary, to reduce refractory sulfide content, is slurried with thiosulfate lixiviant solution, and is preferably leached using a series of stirred contacting tanks through which the finely ground ore material and the thiosulfate lixiviant solution flow countercurrently. Alternatively, precious metal values can be extracted from the finely ground preg-robbing ore material using thiosulfate lixiviant using batch processing. In either case, precious metal values are recovered from the lixiviant solution after the contacting step, preferably by means of precipitation.

DETAILED DESCRIPTION OF THE INVENTION

Figure 1:
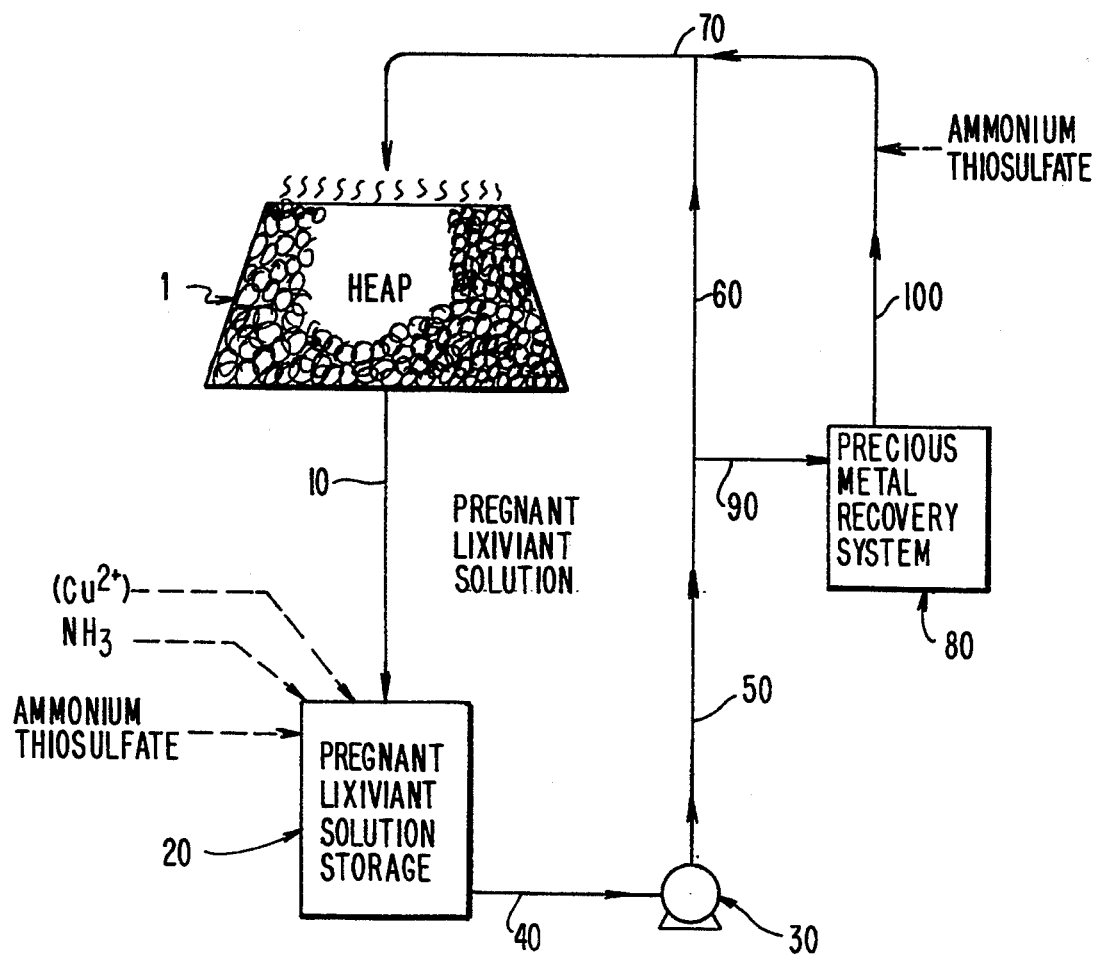
FIG. 1 is a schematic diagram of a precious metal value(s) lixiviation and recovery process for static heaps of ore material in accordance with the present invention.

As previously stated, the present invention is directed to a hydrometallurgical process for the recovery of precious metal values from a refractory precious metal ore materials containing preg-robbing carbonaceous components comprising:
a. providing a body of particles and/or particulates of an ore material having precious metal values and preg-robbing carbonaceous components;
b. contacting the body of particles and/or particulates with a thiosulfate lixiviant solution at conditions conducive to the formation of stable precious metal thiosulfate complexes;
c. recovering the thiosulfate lixiviant from the body of particles and/or particulates after a period of contact which is sufficient for the lixiviant solution to become pregnant with precious metal values extracted from the ore material; and
d. recovering the precious metal values from the lixiviant solution.

The terms "ore" or "ore material" as used herein include not only ore per se, but also concentrates, tailings, spoil or waste in which a sufficient level of precious metal value(s) exists to justify the recovery of those values. The present invention is particularly desirable for use with low-grade ores and/or with materials considered as waste.

Suitable candidate precious metal ores for the practice of the present invention are
1. mixed carbonaceous and sulfidic ores, such as carbonaceous-sulfidic ores,
2. carbonaceous ores;
3. sulfidic ores, e.g., pyritic, arsenopyritic, or arsenian pyrite ores, in which the precious metal, e.g., gold, is associated with the sulfide and
4. mixtures of the foregoing in which preg-robbing carbonaceous material is present.

Refractory carbonaceous-sulfidic and refractory carbonaceous oxide ores having a preg-robbing carbonaceous material content are candidate ores that are amenable in an unexpected manner to the treatment according to the present invention. The present invention is especially suitable for ores that have a preg-robbing carbonaceous material content and enables the efficient recovery of gold from many low grade refractory ores from which no gold or only small amounts of gold can be extracted with cyanide, even in laboratory bottle tests. Heretofore pretreatment to deactivate the preg-robbing carbonaceous content in such ores has been necessary.

Specific ores that may be advantageously treated in accordance with the present invention are carbonaceous or carbonaceous-sulfidic or sulfidic ores; for example, ores from the regions around Carlin, Nev.

A common characteristic of the deposits in the Carlin trend is that sub-micron size gold is disseminated in a quartz or quartz/calcite matrix. Unoxidized ore zones contain organic carbonaceous matter and sulfidic minerals. These gold ores are refractory principally because of the carbonaceous matter contained in the ore. While sulfide minerals may prevent access of a cyanide lixiviant solution to some of the gold, the carbonaceous matter could poison an entire cyanide lixiviation circuit. To the extent that refractory characteristics of these ores derive from their sulfidic content it can be satisfactorily handled with the sulfur pretreatments aforedescribed. To the extent, however, that refractory characteristics in these ore materials are occasioned by preg-robbing carbonaceous components in the ore material, they are not cost effectively overcome in low grade ores by known carbon pretreatments, but are overcome by thiosulfate lixiviation in accordance with the present invention.

The thiosulfate lixiviation of the present invention comprises contacting a body of particles and/or particulates of refractory precious metal ore material which contains preg-robbing carbonaceous material with a solution of thiosulfate lixiviant under condition providing for intimate contact between the two.

When low grade ore material are processed in accordance with the invention, the body of particles and/or particulates preferably comprises a heap of agglomerated particles and particulates, formed as aforedescribed, and the contacting step preferably comprises passing the thiosulfate lixiviant solution through the heap by applying it to the top of the heap at a controlled flow rate under conditions which cause the solution to flow through the heap and intimately wet the agglomerated ore particles. The thiosulfate lixiviant solution is recovered at the bottom of the heap.

When higher grade ore material, containing relatively greater amounts of precious metal are processed in accordance with the invention, the body of particles and/or particulates of refractory precious metal ore material may preferably comprise finely ground particles with a high percentage having a grain size in the range of 200 mesh. In such cases the contacting step preferably comprises forming a slurry of thiosulfate lixiviant solution and the finely ground ore in a stirred vessel.

The thiosulfate lixiviation of the invention can derive the necessary thiosulfate ion from a variety of sources, such as ammonium thiosulfate or sodium thiosulfate or a mixture of both, the conditions under which lixiviation in accordance with the present invention occurs needs to be carefully controlled as to optimize thiosulfate stability, precious metal value extraction and complexing/solvation, and reagent management. In a preferred form, the lixiviant system has 1. an ammonium thiosulfate or sodium thiosulfate (or mixture of both) concentration of at least about 0.05M (corresponding to about 7.5 grams of ammonium thiosulfate per liter of lixiviant solution) and preferably from about 0.1M to about 0.2M (corresponding about 15 to about 30 grams of ammonium thiosulfate per liter of lixiviant solution),
2. a pH of at least about 9 (and preferably about 9.2 to about 10)
3. an oxidizing agent, preferably cupric tetrammine ions $Cu(NH_3)_4^{2+}$, in sufficient concentration to catalyze the oxidation reaction, such as less than 0.001M (less than about 60 parts per million parts of lixiviant solution, and preferably from about 20 to about 30 parts) and
4. an ammonia concentration sufficient to stabilize the thiosulfate complex and the cupric tetrammine, such as at least about 0.05M and preferably at least about 0.1M.

The overall stoichiometry for the dissolution of gold in aqueous thiosulfate solutions in the presence of oxygen is shown in Equation 1, as follows:

(Equation 1)

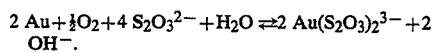

Cupric ion is believed to have a strong catalytic effect on the rate of oxidation since the addition of cupric ion to a thiosulfate solution results in the formation of cupric thiosulfate, $Cu(S_2O_3)_3^{4-}$ or $Cu(S_2O_3)_2^{2-}$ such that, in the presence of oxygen (such as air in the case of heap leaching) the copper remains in an oxidation state as cupric ions. The presence of ammonium ions helps to stabilize the cupric oxidation state as cuptic tetrammine complex ion—$Cu(NH_3)_4^{2+}$. Not only does the presence of ammonia facilitate the formation and stabilization of cupric tetrammine ions, but it aids in neutralizing the ore material and keeping it alkaline. The role of cuptic tetrammine as an oxidant during the dissolution of gold is shown in Equation 2, as follows:

(Equation 2)

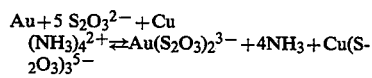

Equation (2) also depicts the cupric/cuprous equilibrium that exists in ammoniacal thiosulfate solutions. However, under oxidizing conditions, oxidative degradation of thiosulfate to tetrathionate occurs and the oxidation reaction is promoted by cuptic ion which is described in Equation 3, as follows:

(Equation 3)

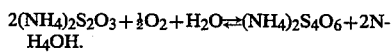

Thus, the amount of cupric ion addition or the concentration of cupric ion is an important factor in thiosulfate stability and reagent management in the heap lixiviation of the present invention.

The pH value for the lixiviant solution (at least about 9) is also important in keeping the gold thiosulfate complex ion stable, i.e., within the stabilized region as indicated in the corresponding Eh-pH diagram for the lixiviant system.

After the lixiviant solution becomes pregnant with precious metal values by contacting the body of refractory precious metal ore material as aforedescribed, the precious metal values may be recovered from the lixiviant solution in a variety of ways, including preferably by precipitation with:

a. copper (such as, metallic copper powder or a copper precipitate from cementation),
b. zinc (such as, metallic zinc powder) or
c. aluminum (such as, metallic aluminum powder) or
d. soluble sulfides. In those instances where zinc, aluminum or soluble sulfides are used as a precipitation agent, it may be desirable to add additional copper ions (such as in the form of copper sulfate) in order to maintain the desired level of cupric ion because zinc, aluminum and soluble sulfide will also remove copper from the lixiviant solution.

It has long been recognized that the reduction of metals from solution is a result of charge-transfer reactions. In this regard, the reaction for gold recovery by zinc cementation can be presented in terms of the respective half cell reactions: cathodic reduction of gold thiosulfate anion as described in Equation 4, as follows:

(Equation 4)

$$Au(S_2O_3)_2^{3-} + e^- \rightleftharpoons Au^\circ + 2\,S_2O_3^{2-}$$

which is coupled to the anodic dissolution of zinc forming zinc thiosulfate complex anion, or zinc ammonioum complex ion:

(Equation 5)

$$Zn^\circ + 2\,S_2O_3^{2-} \rightleftharpoons Zn(S_2O_3)_2^{2-} + 2e^-, \text{ or}$$

$$Zn + 4NH_3 = Zn(NH_3)_4^{2+} + 2e^-$$

The overall reaction for gold precipitation by zinc cementation in the thiosulfate solution is as described in Equation 6, as follows:

(Equation 6)

$$Zn^\circ + 2\,Au(S_2O_3)_2^{3-} \rightleftharpoons 2\,Au^\circ + Zn(S_2O_3)_2^{2-} + 2\,S_2O_3^{2-}, \text{ or}$$

$$Zn^\circ + 2\,Au(S_2O_3)_2^{3-} + 4NH_3 = 2\,Au^\circ + Zn(NH_3)_4^{2+} + 4S_2O_3^{2-}$$

Since cuptic and cuprous ions exist in the thiosulfate leaching solution, the reduction reaction of cupric ion to cuprous ions by zinc will occur and the cuprous ion is further reduced to metallic copper. The cathodic reactions of $Cu^{2+}/Cu^+$ and $Cu^+/Cu$ are indicated in Equation 7 and 8 as follows: (Equation 7)

$$2\,Cu(S_2O_3)_2^{2-} + 2e^- \rightleftharpoons Cu_2(S_2O_3)_3^{4-} + S_2O_3^{2-}$$

and (Equation 8)

$$Cu_2(S_2O_3)_3^{4-} + 2e^- \rightleftharpoons Cu^\circ + 3\,S_2O_3^{2-}.$$

The overall reaction for copper precipitation by zinc can be expressed Equations 9 and 10 as follows:

(Equation 9)

$$2Cu(S_2O_3)_2^{2-} + Zn^\circ + S_2O_3^{2-} \rightleftharpoons Cu_2(S_2O_3)_3^{4-} + Zn(S_2O_3)_2^{2-}$$

(Equation 10)

$$Cu_2(S_2O_3)_3^{4-} + Zn^\circ \rightleftharpoons 2\,Cu^\circ + Zn(S_2O_3)_2^{2-} + S_2O_3^{2-}$$

Thus, the reactions for zinc cementation in the thiosulfate solution include the reduction of (1) copper thiosulfate ion to metallic copper and (2) gold thiosulfate ion to metallic gold.

In the Merrill-Crowe zinc cementation process (using a cyanide lixiviation system), deaeration of the pregnant solution prior to cementation is one of the most important factors for efficient gold recovery. The presence of oxygen passivates the surface of the zinc dust and also causes re-dissolution of the gold precipitate resulting in excessive consumption of zinc and incomplete recovery of gold. However, in the thiosulfate lixiviation system of the present invention, deaeration in the cementation reaction system appears not to be critical provided sufficient zinc is added.

The process of the present invention, as applied to a static heap of preg-robbing ore material, is depicted schematically in FIG. 1 for purposes of illustration, and not of limitation. As aforesaid, a thiosulfate lixiviant solution is passed throughout heap 1 of the aforesaid particles and/or particulates, the precious metal-pregnant lixiviant solution is recovered and passed via conduit 10 to a pregnant lixiviant solution storage reservoir 20. Initially, it may be desirable to use the reservoir 20 to make up the initial lixiviant solution. In that case, water and ammonium thiosulfate are mixed together with a source of cupric ions, such as copper sulfate, sufficient to obtain the appropriate level of cupric ions and a source of ammonia, $NH_3$, to obtain the appropriate level of ammonia concentration.

During operation of the lixiviation and recovery process, additional cupric ions, ammonia and/or ammonium thiosulfate can be added to the reservoir 20 to maintain these reagents at their desired concentrations. Recovered lixiviant solution is moved from reservoir 20 through conduit 40 to pump 30 and then through conduits 50, 60 and 70 to heap 1 where it is distributed over heap 1.

Precious metal recovery is effected by drawing a slipstream through precious metal recovery system 80, which may utilize zinc cementation. Recovered lixiviant solution is drawn from conduit 50 through conduit 90 to recovery system 80 where the precious metal content of the recovered pregnant lixiviant solution is partially or completely recovered and the lean lixiviant solution returned to the main stream conduit 70 via return slipstream conduit 100. Optionally, additional ammonium thiosulfate (and other reagents, such as a source of cupric ions) can be added to the slipstream after processing by recovery system 80. If desired, flow through main stream conduit 60 can be cut off so that all pregnant lixiviant solution flow is through precious metal recovery system 80, so that the entire lixiviant solution is subjected to precious metal recovery with each pass through the lixiviation and recovery process; or it can be decreased so that there is partial flow through recovery system 80, whereupon there will be partial recovery of precious metal values with each pass of lixiviant solution through the process. Alternatively, the entire flow of pregnant lixiviant solution can be through main stream conduit 60 and none through the slipstream (conduits 90 and 100 and recovery system 80) until it is decided to recover precious metal value(s) from the pregnant lixiviant solution.

The thiosulfate lixiviant is passed throughout the heap, recovered and recirculated, either continuously or intermittently, throughout the lixiviation stage. The thiosulfate lixiviant is recycled at a predetermined rate (for example from about 0.002 to about 0.01 gallon per minute per square foot of heap top surface area and preferably at a rate of about 0.005 gallon per minute per square foot of heap top surface area). It may be dispersed by means known in the art for heap leaching processes, with drip irrigation being the preferred dispersal method. Spraying the lixiviation on the heap can also be advantageous, since spraying can increase the oxygen content of the lixiviant solution.

With each pass of the lixiviant solution through the heap the concentration of solubilized precious metal value(s) in the solution incrementally increases. While the precious metal value(s) present in the solution may be recovered at the termination of the heap leaching process, it is preferred, and more efficient, to recover the precious metal values either continuously or intermittently during heap leaching, since a greater amount of precious metal can be leached out of the ore material when the lixiviant solution is not heavily loaded with precious metal values. Further, it is preferable to recover the precious metal values from a portion of the recycle stream of lixiviated solution, using the slipstream aforedescribed. Another approach to precious metal recovery is to continue the thiosulfate lixiviant recirculation until the precious metal content of the lixiviant no longer increases with each recycle and to then recover the precious metal values from the thiosulfate lixiviant.

Figure 2:
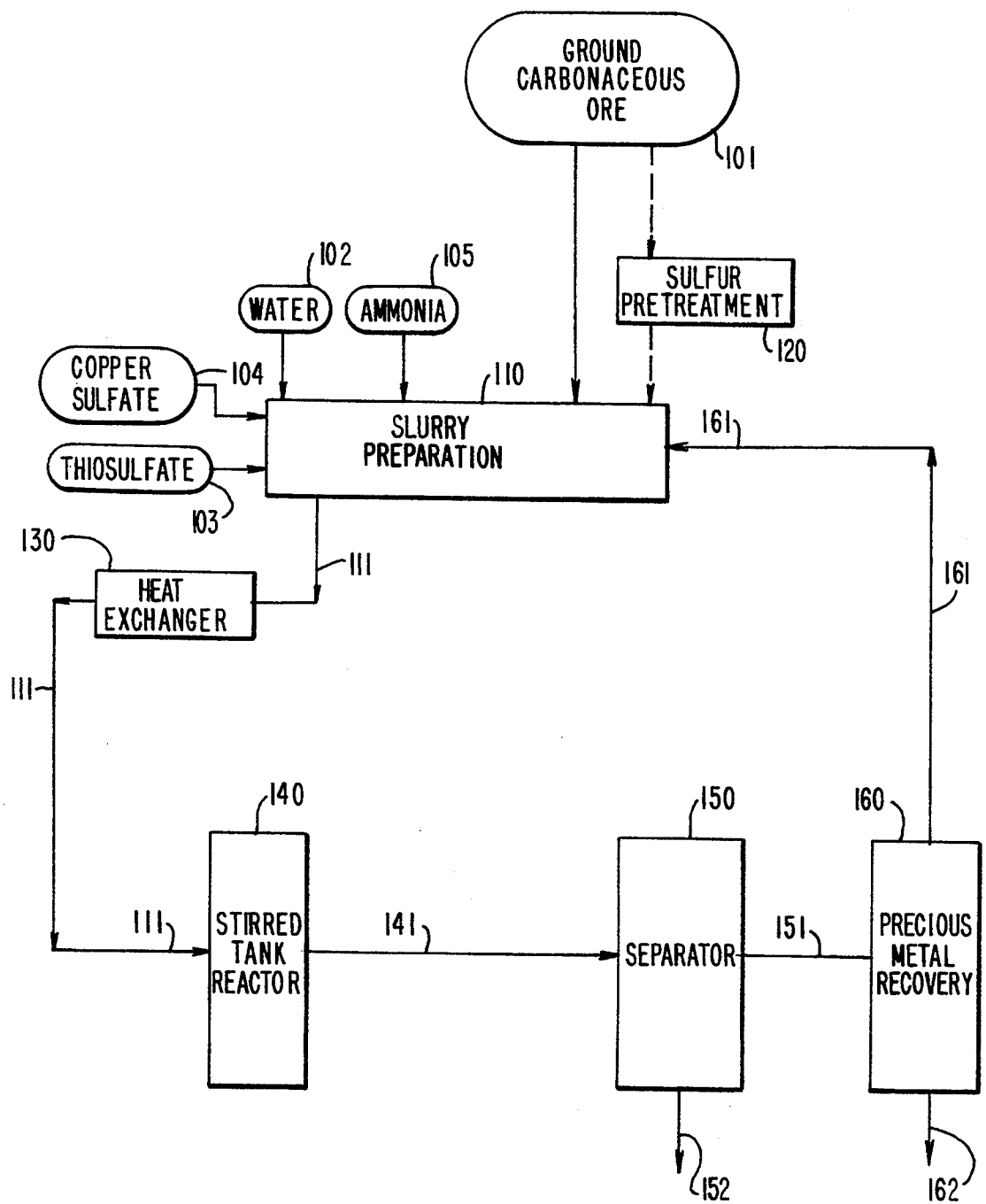
FIG. 2 is block diagram of the major steps in a precious metal value(s) lixiviation and recovery process for finely ground ore material in accordance with the present invention.

The process of the invention, as applied to finely ground refractory precious metal ore material contain preg-robbing carbonaceous components is illustrated in FIG. 2.

Finely ground carbonaceous ore material 101 is initially slurried with water 102, thiosulfate lixiviant 103, copper sulfate 104 and ammonia 105 in slurry preparation unit 110. Each reagent is added in appropriate quantity to establish a lixiviant solution having thiosulfate concentration, solution pH, oxidizing agent concentration and ammonia concentration in the ranges aforedescribed. If finely ground carbonaceous ore material 101 contains sulfidic sulfur which renders ore material 101 refractory, such sulfide content is optionally at least partially oxidized in sulfur pretreatment unit 120 before ground ore 101 reports to slurry preparation unit 110. Sulfur pretreatment is accomplished by conventional means, with preferred modes being microbial oxidation, nitric acid oxidation or autoclaving. The slurry produced in slurry preparation unit 106 has a solids content of between 30 and 60 weight percent, and preferably a solid content between 40 and 50 weight percent.

During the operation of the lixiviation and recovery process, stripped thiosulfate lixiviant 161 is pumped from precious metal recovery unit 160 into slurry preparation unit 110, and provides a significant part of the water, thiosulfate lixiviant, cupric ion and ammonia required in ground ore slurry 111. Consequently, in normal operation, only make-up quantities of water 102, thiosulfate lixiviant 103, copper sulfate 104 and ammonia 105 are added to slurry preparation unit 110 to achieve the desired levels thereof in the lixiviation circuit.

Ground ore slurry 111 is transferred to heat exchanger 130 where, if necessary, the temperature of slurry 111 is adjusted to between about 20° C. and about 45° C. and preferably between about 25° C. and about 35° C. Higher temperatures within the given range have been found to increase the percentage of available gold extracted from most preg-robbing carbonaceous ore materials, but also to increase the thiosulfate losses during lixiviation.

Slurry 111 is next passed to a stirred tank reactor 140 where the thiosulfate lixiviant operates to extract gold, or other precious metals values, from the ground carbonaceous ore material 101. This extraction operation can be carried out in a single stage, or in a plurality of stages, wherein the extracted ore from the first stage is advanced to a succeeding stage, but the thiosulfate lixiviant preferably flows in a counter-current path from the last extraction stage to the first. The lixiviant circuit depicted in FIG. 2 comprises a single stage, however, the number of lixiviant stages can range from a minimum of one stage to four or more stages.

Ground ore slurry 111 is held in stirred tank reactor 140 until the thiosulfate lixiviant in slurry 111 extracts the desired amount of gold, or other precious metal values, from carbonaceous ore material 101. When the lixiviation circuit is operated in the preferred conditions of the invention, the interval of time required for this extraction process is principally controlled by the composition of the ore material being lixiviated, the grain size of the ore material and the number of lixiviation stages in the circuit. Generally, the more finely an ore material has been ground, the shorter the required extraction interval. Ordinarily, the total extraction time in a lixiviation circuit according to the invention will be between 2 and 18 hours and preferably between 4 and 8 hours.

After the appropriate contacting interval, lixiviated ore slurry 141 is transferred from stirred tank reactor 140 to separator 150. Separator 150 is of conventional design wherein the separator overflow is the pregnant lixiviant 151 and the underflow leached residue 152. Residue 152 is transferred to tailings.

Precious metal recovery is effected by processing pregnant thiosulfate lixiviant 151 in precious metal recovery unit 160. Precious metal values are separated from pregnant thiosulfate lixiviant 151, preferably by means of precipitation, such as by zinc cementation or copper cementation. The stripped lixiviant solution 161 is returned to the lixiviation circuit by pumping it to slurry preparation unit 110, where it provides a substantial portion of the water and reagent requirements needed to convert ground carbonaceous ore material 101 into ground ore slurry 111. Additional thiosulfate lixiviant, copper sulfate to provide cupric ions and/or ammonia are added to stripped thiosulfate solution 161 as required to obtain the lixiviant solution pH and oxidizing agent, ammonia and lixiviant concentration previously described. Precious metal stream 162 is removed from precious metal recovery unit 160 and can be further refined using standard techniques.

In the examples to follow various aspects of the present invention are further amplified and such amplifications are intended to be illustrations, but not limitations, of the invention disclosed herein.

EXAMPLE 1

The ore tested was a Gold Quarry carbonaceous/sulfidic ore ("GQ C/S" ore). It had been biooxidized in a sulfur biooxidation test heap for about three months. Particle size during biooxidation ranged from 3 inches to minus 30 mesh. The sample after biooxidation was mixed well for testing. Feed samples before biooxidation and after biooxidation were assayed and the results were averaged and appear in Table 1.

TABLE 1

Chemical Analysis of Gold Quarry Carbonaceous/Sulfidic Ore, Before Biooxidation and After Biooxidation

| | Sample Before Biooxidation | Sample from Test Heap (After Biooxidation) |
|---|---|---|
| Au, opt | 0.064–0.078 | 0.068 |
| Au* (CN), opt | 0.003 | 0.001 |
| Au PR value, opt | 0.070 | NA |
| C (total), % | 1.25 | 1.22 |
| C (organic), % | 1.20 | 1.20 |
| S (total), % | 2.36 | 1.80 |
| S (sulfate), % | 1.04 | 0.95 |
| S (sulfide), % | 1.32 | 0.85 |

TABLE 1-continued

Chemical Analysis of Gold Quarry Carbonaceous/Sulfidic Ore, Before Biooxidation and After Biooxidation

|  | Sample Before Biooxidation | Sample from Test Heap (After Biooxidation) |
|---|---|---|
| Iron, % | 1.58 | NA |

*Cyanide leachable gold.

Test heap biooxidation resulted in sulfide oxidation of 35%.

Results for Au(CN) indicate the gold in the sample that is leachable by cyanide. The ratio of Au(CN) to Au is 0.015 which indicates that only 1.5% can be extracted by cyanidation—even after biooxidation. Therefore, the sample is very refractory.

The sample was submitted for semiquantitative X-ray diffraction analysis which indicated that the sample comprised 72% quartz, 10% alunite, 7% sericite, 4% kaolin, 3% barite and 3% iron oxides by weight.

The sample was crushed to minus 10 mesh. Laboratory columns were loaded with 500 grams of this minus 10 mesh material, washed thoroughly with water and conditioned with $Na_2CO_3$ solution 10 grams per liter to adjust the pH of the ore sample. Leach solution was continuously recycled to the top of the column and dripping from top to bottom. Two column leach tests were conducted; one column for ammonium thiosulfate and one for sodium thiosulfate. Both column tests were performed at a pH of about 10, using 0.085M thiosulfate solution, 0.01M of cupric ion and weight ratio of liquid to solid of 2. Test results are shown in Table 2 as follows.

TABLE 2

Thiosulfate Column Leach Tests on 10 Mesh Sample

| Reagent | Ammonium Thiosulfate | Sodium Thiosulfate |
|---|---|---|
| Pregnant: Au ppm | | |
| Time: | | |
| 24 hours | 0.472 | 0.403 |
| 48 hours | 0.488 | 0.473 |
| 72 hours | 0.506 | 0.518 |
| Residue: Au, opt | 0.024 | 0.030 |
| Calculated Head: Au, opt | 0.062 | 0.068 |
| Au Extraction at 72 hours | | |
| (1) | 64.71% | 55.88% |
| (2) | 61.29% | 55.88% |

(1) Based on head and residue assay
(2) Based on calculated head

Gold extraction based on residue assay after 72 hours was 64.7% by ammonium thiosulfate leach and was 55.9% by sodium thiosulfate leach.

The column leach tests were conducted by recycling leach liquor without gold recovery. The long retention time with increasing gold concentration in pregnant solution confirmed that gold thiosulfate complex was not adsorbed by refractory carbonaceous material in the ore under these conditions.

EXAMPLE 2

Gold Quarry carbonaceous/sulfidic ore from the same source as Example 1 and having the same composition as indicated in Example 1, after three months of biooxidation on the test heap as previously described, was stage crushed with 100% passing ½" and then further biooxidized in a laboratory column for about 2 weeks. The sulfide oxidation of this sample was about 47%. Gold extraction using cyanide lixiviation was less than one percent (1%) indicating that the ore was very refractory.

Columns used in this study were 2 inches in diameter and 12 inches in height. Each column was loaded with 500 grams of sample. The biooxidation sample was washed with water to remove most of the solubilized iron and conditioned with $Na_2CO_3$ solution 10 grams per liter for about 2 days. Ammonium thiosulfate solution was prepared as specified by the testing. Solution pH was adjusted in the range of from 9 to 10 with sodium carbonate. Leach solution was pumped at a flow rate of 2.0 ml/min from the solution reservoir to the top of the column, collected from the bottom of the column into the same reservoir and recycled back to the leach column. No gold recovery unit was connected to the leach system. Solution samples were taken from the leach reservoir on a timed interval and submitted for gold and copper analysis. Thiosulfate concentration was measured as well as pH and Eh value of these solution samples. Thiosulfate concentration was determined by a iodometric titration method in which a solution sample is titrated with standard iodine solution at controlled pH. In some cases, solution was treated with formaldehyde to fix sulfite. A standard thiosulfate solution was prepared to calibrate the iodine solution before titration.

Following leaching, residues from these column tests were sampled, pulverized and submitted for chemical analysis. Gold extractions were calculated based on the residue and feed assay data.

Column tests were performed with various concentrations of ammonium thiosulfate in the range of 8.7 to 16.9 gpl. Because no gold recovery system was included in these column leach tests, the ammonium thiosulfate solution was periodically changed with freshly prepared solution. This was done to maintain a strong driving force for gold leaching and to simulate the situation in which a gold recovery system would be included. The ammonium thiosulfate leach conditions and results for the column tests (including the results for each period in which fresh thiosulfate solution had been added) are presented in Table 3.

TABLE 3

Ammonium Thiosulfate Leach Column

|  | Column 1 | Column 2 | Column 3 | Column 4 |
|---|---|---|---|---|
| $(NH_4)_2S_2O_3$, gpl | 8.44 | 16.87 | 14.8 | 14.8 |
| Liquid/Solid Ratio | 0.5/1 | 0.5/1 | 1/1 | 1/1 |
| pH | ~9.8 | ~9.8 | ~9.9 | ~9.3 |
| Total leach, Days | 15.8 | 15.8 | 12.3 | 12.3 |
| Period I | | | | |
| Leach Days | 8.8 | 8.8 | 3.3 | 3.3 |
| Au Extraction % | 27.37 | 45.53 | 27.72 | 38.16 |
| Period II | | | | |
| Leach Days | 7.0 | 7.0 | 5.0 | 5.0 |
| Au Extraction % | 15.28* | 12.21* | 15.85 | 21.42 |
| Period III | | | | |
| Leach Days | — | — | 4.0 | 4.0 |
| Au Extraction % | — | — | 6.44* | 8.07 |
| Residue | | | | |
| Au, opt | 0.039 | 0.027 | 0.034 | 0.022 |
| Cu, ppm | 150.0 | 135.0 | 163.46 | 158.66 |
| S (total), % | 1.79 | | 1.70 | 1.78 |
| S (sulfide), % | 0.50 | 1.70 | 0.44 | 0.40 |
| | | 0.51 | | |
| Au Extraction, % | 42.65 | 60.29 | 50.00 | 67.65 |

*Included gold in wash solution.

Figure 3:
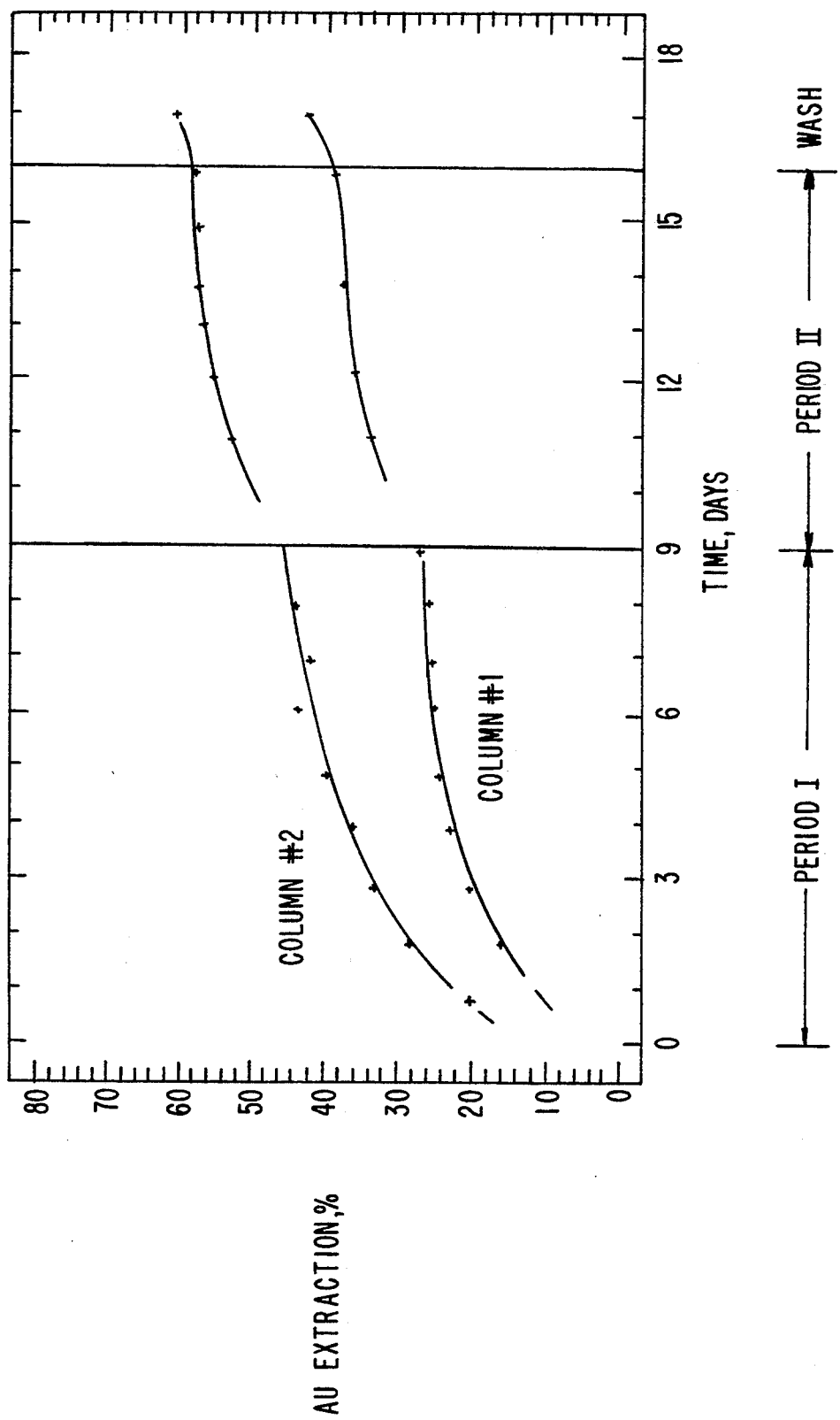
FIG. 3 is a graph that plots the cumulative percent gold extracted from the ore sample versus column leaching duration in days for columns 1 and 2 of Example 2.
Figure 4:
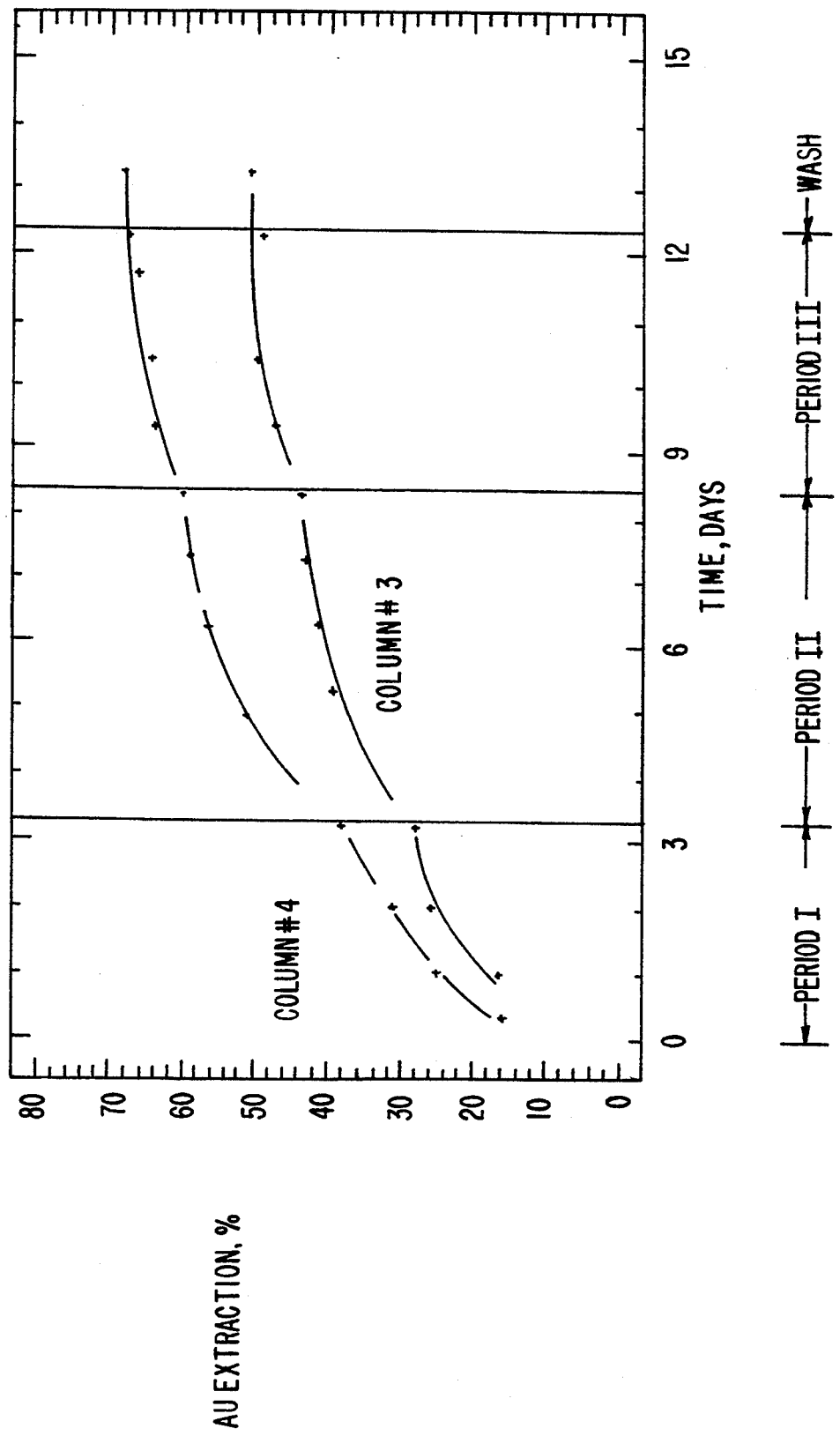
FIG. 4 is a graph that plots the cumulative percent gold extracted from the ore sample versus column leaching duration in days for columns 3 and 4 of Example 2.

Based on daily leach solution assay data, cumulative gold extractions of these columns are presented in FIGS. 3 and 4. The thiosulfate solution was replaced with fresh thiosulfate solution during the test. With respect to columns 1 and 2, the thiosulfate solution was replaced at about nine days and then drained at about 16 days followed by a water wash. With respect to columns 3 and 4, the thiosulfate solution was replaced at about three days, again at about eight days and then drained at about 12 days followed by a water wash. As can be seen from FIGS. 3 and 4 the gold concentration is affected by the thiosulfate concentration and liquid-to-solid ratio. One important observation from the FIGS. 3 and 4 results is that the gold concentration did not decrease after recycling the pregnant solution during the same leach period. This indicates that gold thiosulfate was not preg-robbed by the ore's carbonaceous species under these conditions.

Among these tests, column 4 gave the highest gold extraction (67.65%) with residue gold of 0.022 opt (ounces per ton). The leaching solution volume used in columns 3 and 4 was twice the amount used in columns 1 and 2, and one addition of fresh thiosulfate solution was used for columns 3 and 4 during the leach period. Column 2 gave gold extraction of 60% with residue gold of 0.027 opt.

EXAMPLE 3

Figure 5:
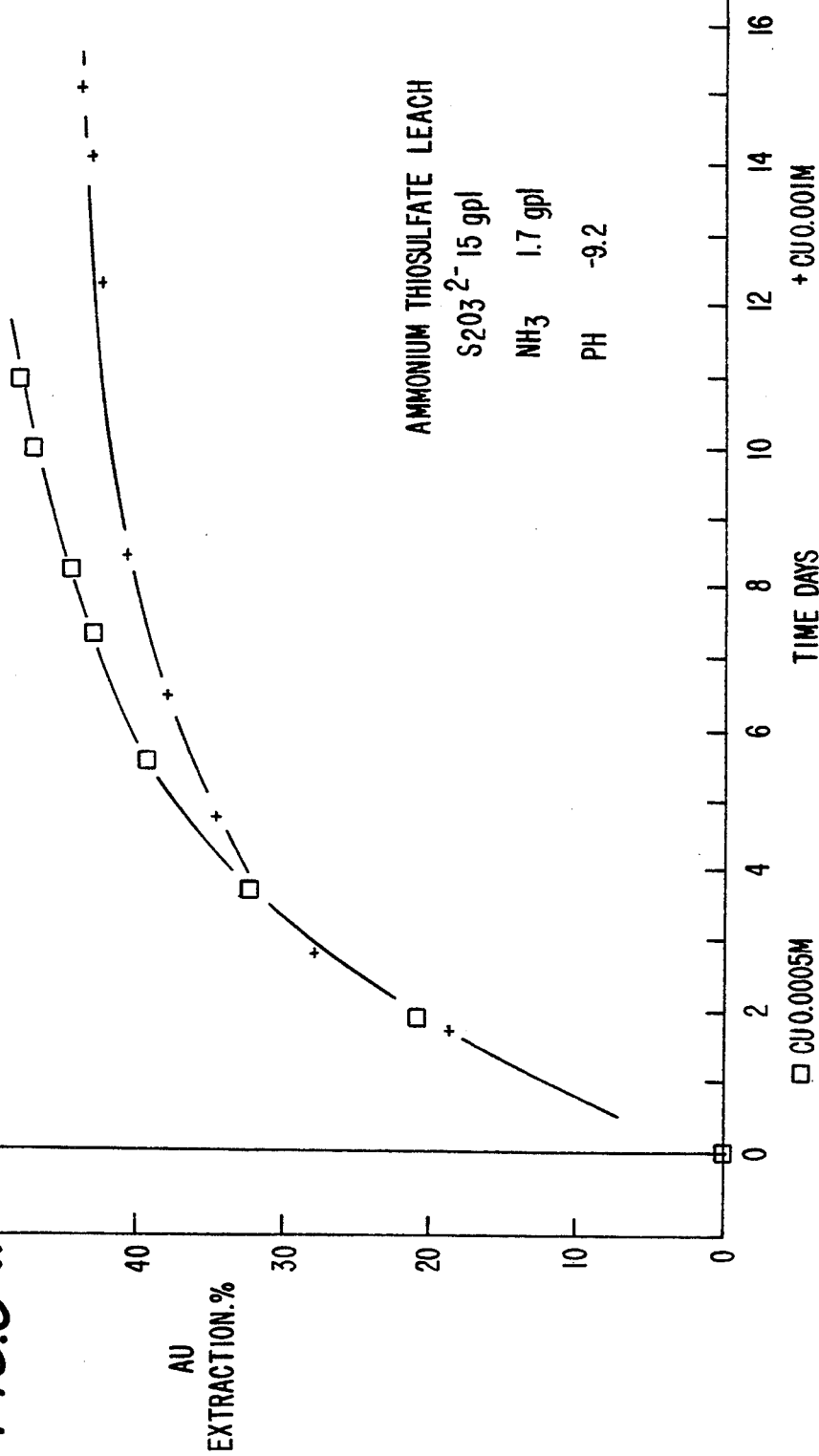
FIG. 5 is a graph that plots the cumulative percent gold extracted from the ore sample versus column leaching duration in days at various cupric ion concentrations in the lixiviant solution.

Samples from the same ore as EXAMPLE 2 and having the same treatment as EXAMPLE 2 were column leached under the same conditions as EXAMPLE 2 were column leached under the same conditions as EXAMPLE 2, except that an ammonium thiosulfate lixiviant solution having 15 grams per liter of ammonium thiosulfate, an ammonia ($NH_3$) concentration of 1.7 grams per liter and a pH of approximately 9.2 was used. The cuptic ion concentration was either 0.0005 Molar (31.8 milligrams per liter) or 0.001 Molar (63.5 milligrams per liter.) The results are shown in FIG. 5 in which the cumulative percentage of gold extraction is plotted against the duration of time the respective lixiviant solutions are recirculated through the column. It was determined that a lower concentration of cuptic ions (0.0005M) was more effective when used in column leaching.

EXAMPLE 4

Figure 6:
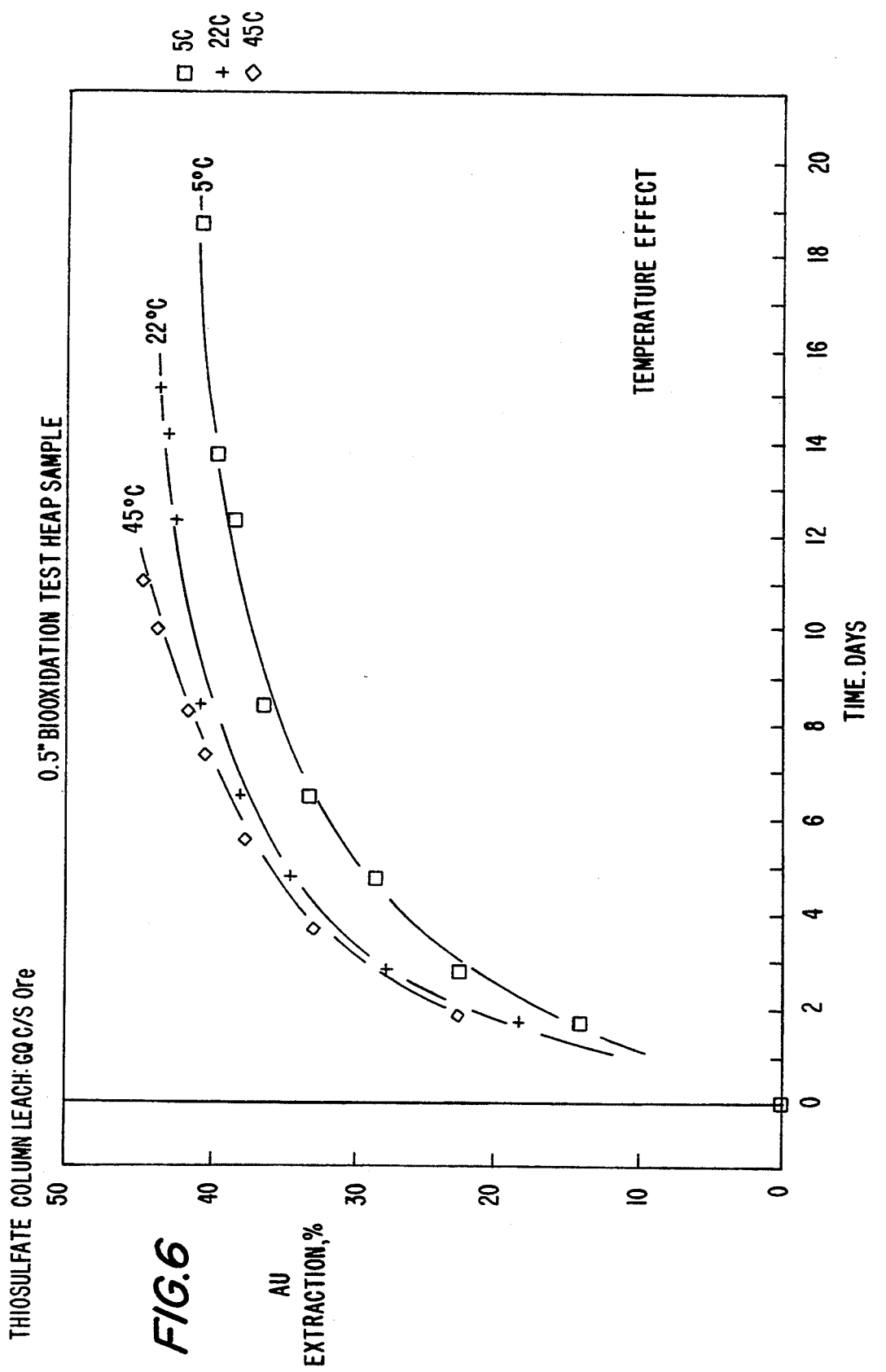
FIG. 6 is a graph that plots the cumulative percent gold extracted from the ore sample versus column leaching duration in days at various column and lixiviant solution temperatures.

Samples from the same ore as EXAMPLE 2 and having the same treatment were column leached under the same conditions as EXAMPLE 2, except that each of three columns and lixiviant solutions were operated at 5° C., 22° C. and 45° C. to determine the effect of ambient temperature on the lixiviant of gold. The results are shown in FIG. 6 in which cumulative percent of gold extraction is plotted against the duration of time the lixiviant solution was recirculated through a column at each of the respective temperatures. FIG. 6 demonstrates that thiosulfate lixiviation according to the present invention is very robust with respect to ambient temperatures.

EXAMPLE 5

Samples were taken from the same sample ore as Example 2 and had the same composition. Sulfide oxidation of this sample was 47%. Following biooxidation, the sample was washed with water and agglomerated with 5 lb/ton of cement. Thiosulfate leaching was conducted at a concentration of 0.2M (or about 30 gpl) ammonium thiosulfate, 0.1M of free ammonia and 0.0003M of cupric ion. 45.5 kilograms of sample was leached in a 8 inch column. Solution to solid sample ratio was 0.2:1 and the leach solution flow rate was controlled at 0.005 gallon per minute per square foot ($GPM/ft^2$). The pregnant solution was periodically replaced with fresh solution. After 24 days of leaching, the samples were taken out of the column, mixed and submitted for chemical analysis. The average chemical analytical results of this leach residue are given in Table 5, as follows:

TABLE 5

| | Au opt | S (total) % | S (sulfate) % | S (sulfide) % |
|---|---|---|---|---|
| Leach Residue | 0.030 | 1.68 | 1.31 | 0.37 |

Figure 7:
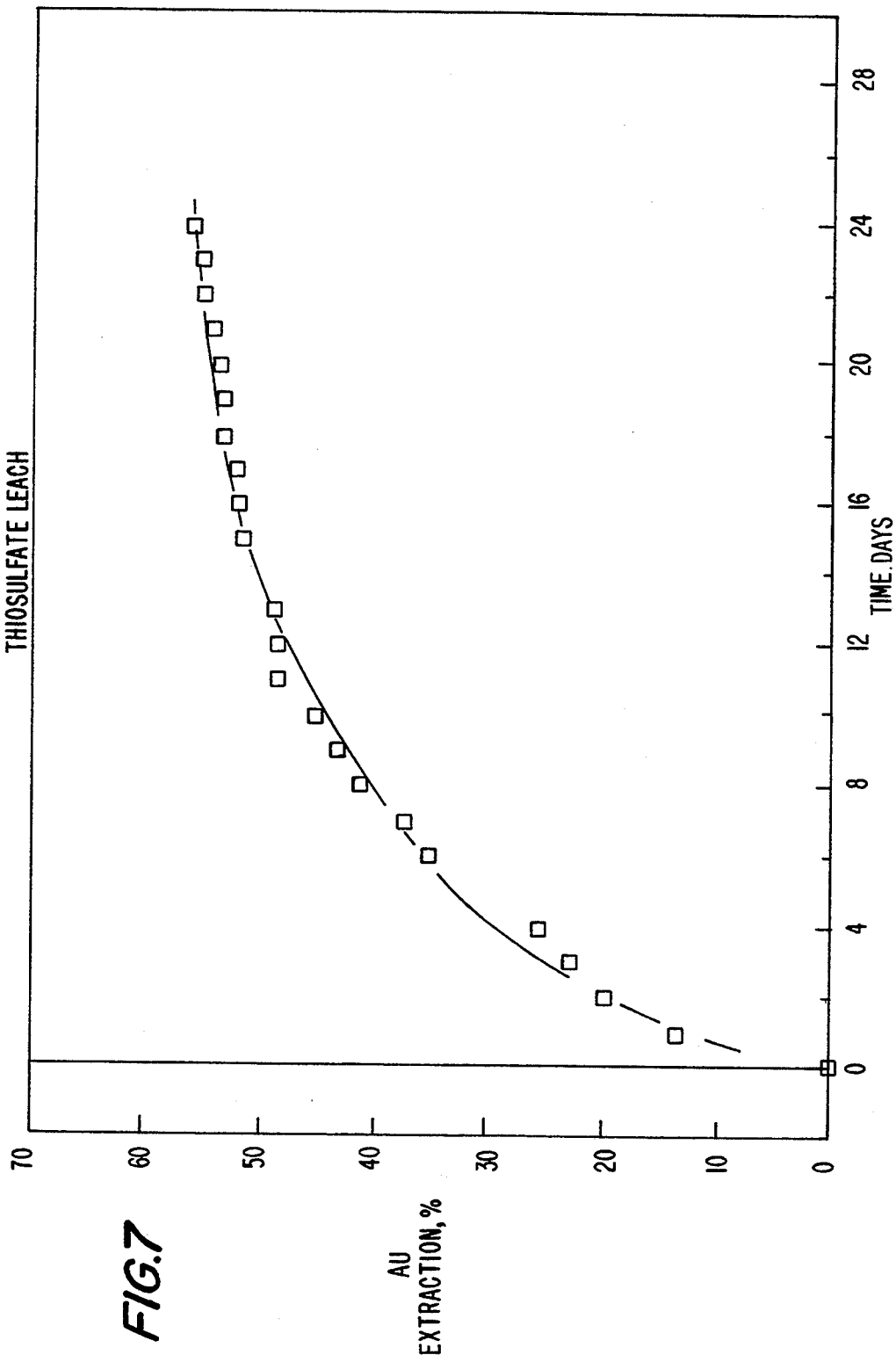
FIG. 7 is a graph that plots the cumulative percent gold extracted from the ore sample versus column leaching duration in days.

Gold extraction based on residue and leach analysis was 55.2% after 24 days leaching. The gold extraction curve is given in FIG. 7.

EXAMPLE 6

Thiosulfate column leaching was tested on a partially biooxidized sample of Gold Quarry Carbonaceous/Sulfidic ore obtained from another biooxidation heap at a particle size of about 1 inch. The sample was collected after 95 days of biooxidation with an average sulfide sulfur content of 0.43% as compared to 0.83% sulfide sulfur in the feed sample (before biooxidation). About 48% of the sulfide content was oxidized after biooxidation. The average chemical composition analytical data of the sample before and after biooxidation are given in Table 6.

TABLE 6

| Chemical Analysis of Carbonaceous/Sulfide Ore Before Biooxidation and After Biooxidation | | | |
|---|---|---|---|
| | Sample Before Oxidation | Sample After Biooxidation | |
| | | Test 1 | Test 2 |
| Au, opt | 0.073 | 0.074 | 0.078 |
| Au (CN), opt | 0 | 0 | 0 |
| C (organic), % | 1.00 | 1.02 | 0.97 |
| S (total), % | 1.74 | 1.80 | 1.48 |
| S (sulfate), % | 0.92 | 1.37 | 1.18 |
| S (sulfide), % | 0.83 | 0.43 | 0.50 |

Cyanide gold extraction Au(CN) was about zero indicating the highly refractory character of this sample.

A total amount of 91 kilograms or 200 lbs. of sample was used for each test. Each ore sample was washed with water and agglomerated with 5 lb/ton cement before thiosulfate column leaching. Leach solution was pumped from a reservoir (with 10 liters of lixiviate) to the top of the column at a flow rate of 0.005 gpm/ft$^2$. The effluent was analyzed and periodically gold was removed from the solution by cementation process. Barren solution was recycled for further leaching.

Two tests are presented as an example. Thiosulfate leaching was conducted at an initial concentration of 0.2M ammonium thiosulfate, 0.1M of free ammonia and 0.003M of cupric ion.

In test 1, the gold in the pregnant solution was periodically removed from solution by cementation with zinc powder. After zinc cementation, the barren solution was returned to the reservoir in the leach circuit. The thiosulfate and copper concentrations were adjusted based on the analytical data.

In test 2, the gold in the pregnant solution was periodically removed from solution by cementation with copper powder. Also, only half of the pregnant solution was split to gold recovery. After cementation, the barren solution was combined with the pregnant solution and returned to the column for recirculation.

Figure 8:
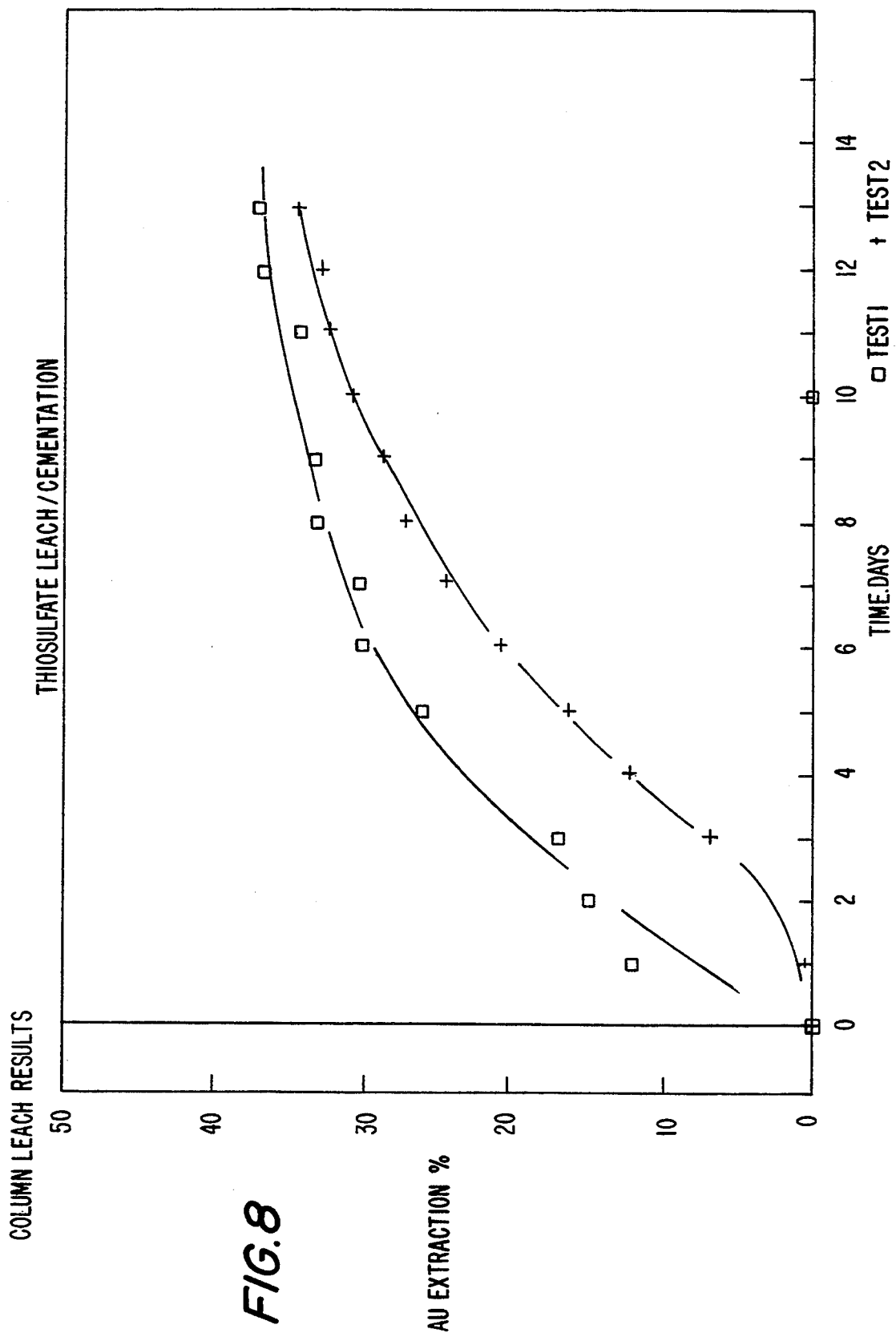
FIG. 8 is a graph that plots the cumulative percent gold recovered from the lixiviant solution versus elapsed process time in days for recovering gold using zinc and copper cementation.

Gold extractions for test 1 and test 2 are shown in FIG. 8. While it would appear that the rate of extraction for test 2 is slower than that for of test 1, this is only an experimental artifact created by the different cycle times involved with the cementation process. The extractions were nearly identical after 14 days of leaching.

EXAMPLE 7

Figure 9:
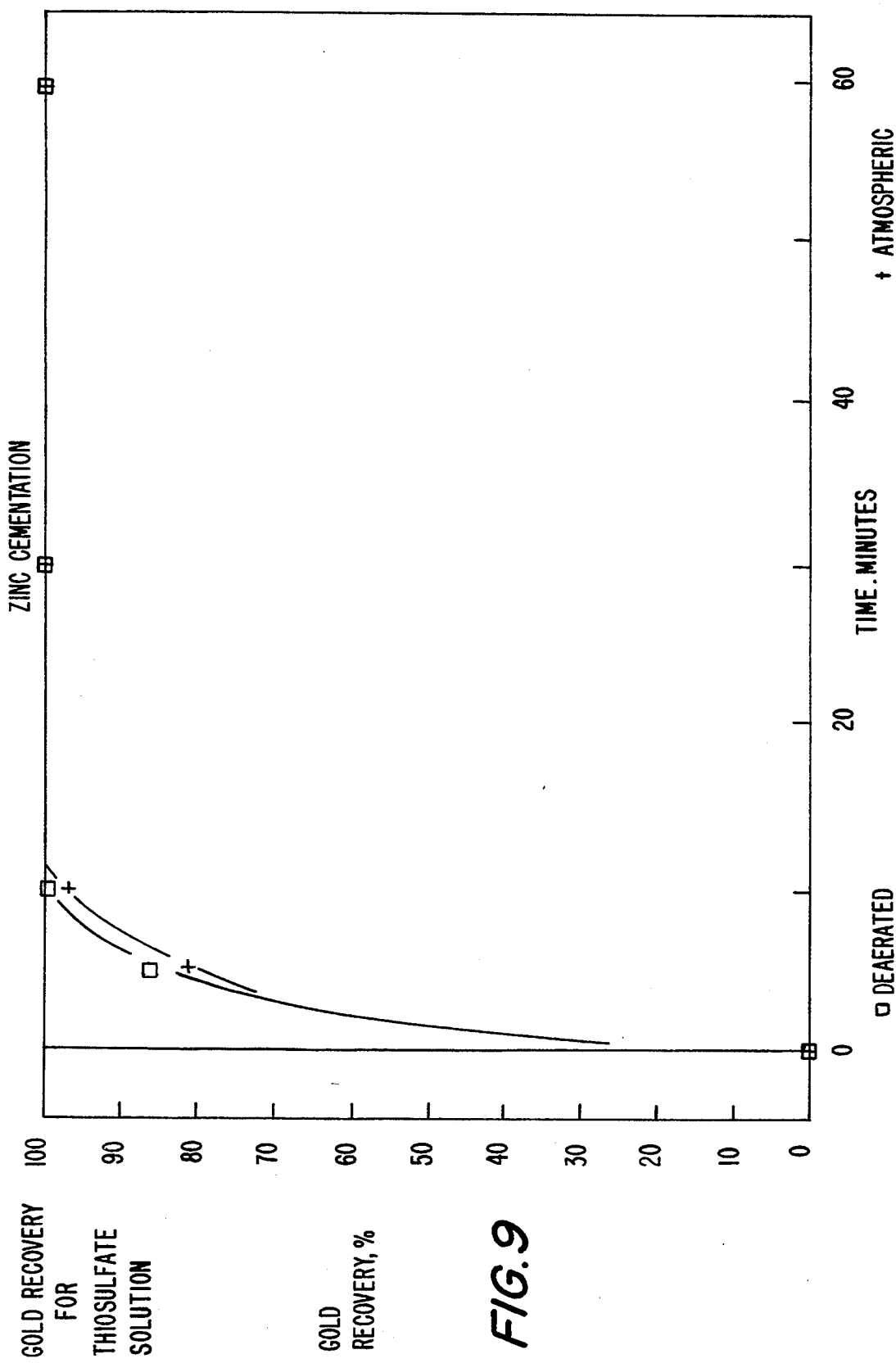
FIG. 9 is a graph that plots cumulative percent gold recovered from the lixiviant solution versus elapsed time in minutes using zinc cementation under deaerated or atmospheric conditions; and, FIG. 10 is a graph that plots cumulative percent gold recovered from the lixiviant solution versus elapsed time in minutes using copper cementation under deaerated or atmospheric conditions.

This example presents the test results for gold recovery by zinc cementation from thiosulfate solution. The cementation of gold was tested from an actual column leach solution with Au 1.27 ppm, $S_2O_3^{2-}$ 13.82 grams per liter, Cu 28.9 ppm and pH~9.3 at 23° C. The amount of zinc powder addition was 0.23 grams per liter. Gold recovery as a function of time was compared under deaeration conditions and also atmospheric conditions, i.e., open to the air. Results are given in FIG. 9. In both cases, the gold cementation reaction was very fast and complete gold precipitation was achieved within 10 minutes. Precipitation of the copper behaves similarly to that of the gold.

EXAMPLE 8

Figure 10:
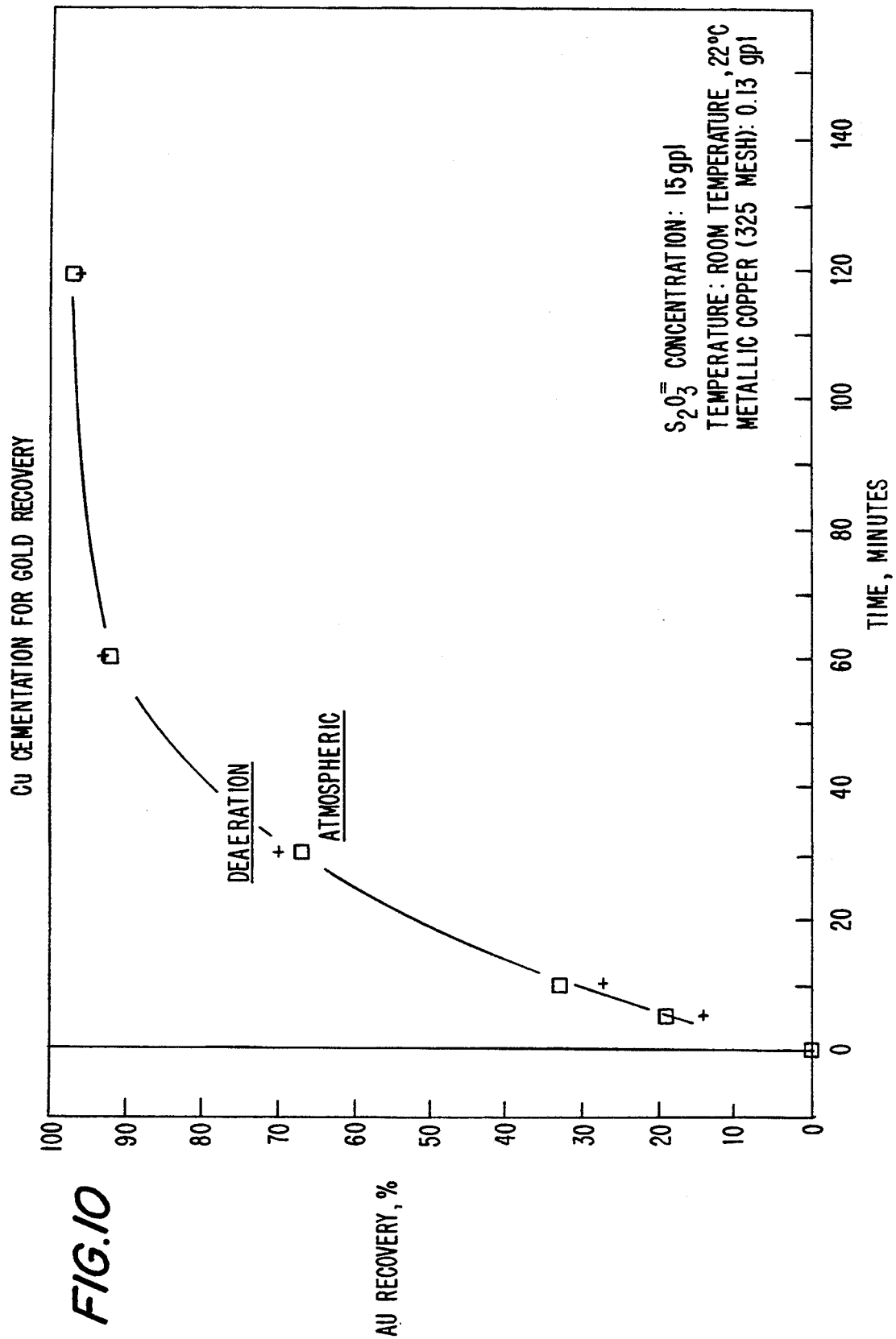

Example 7 was repeated, except that gold recovery was performed by Cu cementation under deaerated condition and open to the air with 0.13 grams per liter of copper powder being used instead of zinc powder, a thiosulfate concentration of 15 grams per liter and a temperature of 22° C. The results are illustrated in FIG. 10 which shows virtually no difference between cementation under deaerated conditions and aerated conditions.

While the present invention has been discussed with respect to sulfidic and mixed carbonaceous and sulfidic ore materials in which preg-robbing carbon is present, it should be understood that the present invention is also amenable to use with carbonaceous ore materials in which preg-robbing carbon is present.

While the exact reasons that cause the process of the present invention to produce the herein-observed results are not fully known and could not be predicted, the results themselves bespeak the achievements that have been obtained-based merely on the percent of gold extraction from these refractory ores at improved economies and using a less complicated approach than prior technology can show.

It is also evident from the foregoing that various combinations and permutations may we be practiced and advanced, but these are not to be understood as limiting the invention which has been defined in the claims which follow.

We claim:

1. A hydrometallurgical process for the recovery of precious metal values from a refractory precious metal ore material comprising
   a. providing a static heap of particles and/or particulates comprising an ore material having precious metal values and a preg-robbing carbon content said heap having a pH of at least about 9;
   b. passing a thiosulfate lixiviant solution through the static heap of particles and/or particulates;
   c. recovering the thiosulfate lixiviant solution pregnant with extracted precious metal values after it has passed through the static heap;
   d. recycling the recovered thiosulfate lixiviant solution to step b.; and
   e. at least periodically recovering the precious metal values from the thiosulfate lixiviant solution.

2. A hydrometallurgical process as defined by claim 1 wherein said precious metal values comprise gold.

3. A hydrometallurgical process as defined by claim 1 wherein said ore material is selected from at least one member of the group consisting of mixed sulfidic and oxide ores, carbonaceous ores and sulfidic ores.

4. A hydrometallurgical process as defined by claim 1 wherein 90% by weight of said particles and/or particulates are less than two inches in size.

5. A hydrometallurgical process as defined in claim 1 wherein said thiosulfate lixiviant solution has a pH of at least about 9.

6. A hydrometallurgical process as defined by claim 1 wherein said thiosulfate lixiviant solution comprises an aqueous solution of ammonium thiosulfate or sodium thiosulfate or a mixture of both.

7. A hydrometallurgical process as defined by claim 6 wherein said thiosulfate is present in a concentration of at least .05M.

8. A hydrometallurgical process as defined by claim 1 wherein said lixiviant solution further comprises cupric ions.

9. A hydrometallurgical process as defined by claim 8 wherein said cupric ions are present in a concentration from about 20 to about 30 parts per million parts of lixiviant solution.

10. A hydrometallurgical process as defined by claim 9 wherein said cupric ions are present in the form of tetrammine cupric ions.

11. A hydrometallurgical process as defined by claim 1 wherein said lixiviant solution further comprises free ammonia.

12. A hydrometallurgical process as defined by claim 11 wherein said ammonia is present in a concentration of at least about 0.05M.

13. A hydrometallurgical process as defined by claim 1 wherein said precious metal values are recovered from the thiosulfate lixiviant solution by zinc cementation, copper cementation, aluminum cementation or soluble sulfide precipitation.

14. A hydrometallurgical process as defined by claim 1 wherein said precious metal values are recovered from the thiosulfate lixiviant solution by cementation.

15. A hydrometallurgical process as defined by claim 10 wherein said precious metal values are recovered from the thiosulfate lixiviant solution by either copper or zinc cementation.

16. A hydrometallurgical process as defined by claim 1 wherein precious metal values are recovered continuously from the thiosulfate lixiviant solution.

17. A hydrometallurgical process as defined in claim 1 wherein the entire recovered thiosulfate lixiviant solution is subjected to recovery of precious metal values before recycling to step b.

18. A hydrometallurgical process as defined by claim 1 wherein a portion of the recovered thiosulfate lixiviant solution is subject to recovery of precious metal values before recycling to step b.

19. A hydrometallurgical process as defined by claim 1 wherein said ore material comprises a sulfidic ore and said ore material has been biooxidized with a microbial agent to decrease the sulfidic sulfur content of said ore material.

20. A hydrometallurgical process as defined in claim 19 wherein at least about 40% of the sulfidic sulphur content of said sulfidic ore has been biooxidized with said microbial agent.

21. A hydrometallurgical process as defined by claim 1 wherein said static heap has an upper surface defining a top of said heap and said thiosulfate lixiviant solution is recycled to step b. at a rate from about 0.002 to about 0.01 gallon per minute per square foot of surface area at the top of said static heap.

22. A hydrometallurgical process as defined by claim 1 wherein about 90% by weight of said particles and/or particulates are less than 2 inches in size, said thiosulfate lixiviant solution comprises an aqueous solution of ammonium thiosulfate or sodium thiosulfate or a mixture of both, and said solution has a thiosulfate concentration of at least 0.05M and a pH of at least about 9.

23. A hydrometallurgical process as defined by claim 22 wherein said precious metal values comprise gold and said lixiviant solution further comprises cupric ions in a concentration from about 20 to about 30 parts per million and free ammonia in a concentration of at least about 0.05M.

24. A hydrometallurgical process as defined by claim 23 wherein a portion of the recovered thiosulfate lixiviant solution is subjected to recovery of precious metal values before recycling to step b.

25. A hydrometallurgical process for the recovery of precious metal values from a static heap of particles and/or particulates of ore material containing precious metal values and preg-robbing carbonaceous materials which have not been deactivated with chemical agents or biological agents, comprising: adjusting the pH of the static heap of ore materials to at least about 9, extracting at least a portion of said precious metal values from the static heap of ore materials by passing a thiosulfate lixiviant solution through said heap, recovering the thiosulfate lixiviant solution pregnant with extracted precious metal values after it has passed through said static heap, recirculating at least a portion of the recovered thiosulfate lixiviant solution through said static heap, and at least periodically recovering said precious metal values from said thiosulfate lixiviant solution.

26. A hydrometallurgical process as defined by claim 25 wherein said thiosulfate lixiviant solution comprises an aqueous solution of ammonium thiosulfate or sodium thiosulfate or a mixture of both having a thiosulfate concentration of at least 0.05M and a pH of at least 9.

27. A hydrometallurgical process as defined by claim 26 wherein said precious metal values comprise gold, said lixiviant solution further comprises cupric ions in a concentration from about 20 to about 30 parts per million and free ammonia in a concentration of at least about 0.05M.

28. A hydrometallurgical process as defined by claim 26 wherein a portion of the thiosulfate lixiviant solution pregnant with extracted precious metal values has at least a portion of said precious metal values recovered therefrom and is then recirculated through said static heap.

29. A hydrometallurgical process as defined by claim 26 wherein said static heap has an upper surface defining the top of said static heap, about 90% by weight of said particles and/or particulates in said static heap are less than 2 inches in size, and said thiosulfate lixiviant solution is passed through said static heap at a flow rate from about 0.002 to about 0.01 gallons per minute per square foot of surface area at the top of said static heap.

30. A hydrometallurgical process as defined by claim 25 wherein said ore material is selected from at least one member of the group consisting of mixed sulfidic and oxide ores, carbonaceous ores and sulfidic ores.

31. A hydrometallurgical process as defined by claim 30 wherein said ore material comprises a sulfidic ore having sulfidic sulphur content and said ore material has been biooxidized with a microbial agent to decrease the sulfidic sulphur content of said ore material.

32. A hydrometallurgical process for the recovery of precious metal values from a refractory precious metal ore material containing precious metal values and preg-robbing carbonaceous compounds comprising:
 a. providing a body of particles and/or particulates of the refractory precious metal ore material;
 b. contacting the body of particles and/or particulates with a thiosulfate lixiviant solution at conditions conducive to the formation of stable precious metal thiosulfate complexes;
 c. recovering the thiosulfate lixiviant from the body of particles and/or particulates after a period of contact which is sufficient for the lixiviant solution to become pregnant with precious metal values extracted from the ore material; and
 d. recovering the precious metal values from the lixiviant solution.

33. A hydrometallurgical process as defined by claim 32 wherein said ore material is selected from at least one member of the group consisting of mixed sulfidic and oxide ores, carbonaceous ores and sulfidic ores.

34. A hydrometallurgical process as defined by claim 33 wherein said thiosulfate lixiviant solution comprises an aqueous solution of ammonium thiosulfate or sodium thiosulfate or a mixture of both having a thiosulfate concentration of at least 0.05M and a pH of at least 9.

35. A hydrometallurgical process as defined by claim 34 wherein said precious metal values comprise gold, said lixiviant solution further comprises cupric ions in a concentration from about 20 to about 30 parts per million parts of lixiviant solution and free ammonia in a concentration of at least about 0.05M.

36. A hydrometallurgical process as defined by claim 35 wherein said cupric ions are present in the form of tetrammine cupric ions.

37. A hydrometallurgical process as defined by claim 33 wherein said ore material comprises a sulfidic ore having sulfidic sulphur content and said ore material has been biooxidized with a microbial agent to decrease the sulfidic sulphur content of said ore material.

38. A hydrometallurgical process as defined in claim 37 wherein at least about 40% of the sulfidic sulfur content of said sulfidic ore has been biooxidized with said microbial agent.

39. A hydrometallurgical process as defined by claim 32 wherein said precious metal values are recovered from the thiosulfate lixiviant solution by zinc cementation, copper cementation, aluminum cementation or soluble sulfide precipitation.

40. A hydrometallurgical process as defined by claim 32 wherein said body of particles and/or particulates of refractory precious metal ore material comprises a static heap and said static heap has an upper surface defining the top of said static heap, and said thiosulfate lixiviant solution is passed through said static heap at a flow rate from about 0.002 to about 0.01 gallons per minute per square foot of surface area at the top of said static heap.

41. A hydrometallurgical process as defined by claim 40 wherein 90% by weight said particles and/or particulates are less than two inches in size.

42. A hydrometallurgical process as defined by claim 41 wherein said thiosulfate lixiviant solution comprises an aqueous solution of ammonium thiosulfate or sodium thiosulfate or a mixture of both having a thiosulfate concentration of at least 0.05M and a pH of at least 9.

43. A hydrometallurgical process as defined by claim 42 wherein said ore material is selected from at least one member of the group consisting of mixed sulfidic and oxide ores, carbonaceous ores, and sulfidic ores.

44. A hydrometallurgical process as defined by claim 43 wherein said ore material comprises a sulfidic ore having sulfidic sulfur content and said ore material has been biooxidized with a microbial agent to decrease the sulfidic sulfur content of said ore material.

45. A hydrometallurgical process as defined by claim 44 wherein said precious metal values comprise gold and said lixiviant solution further comprises cupric ions in a concentration from about 20 to about 30 parts per million parts of lixiviant solution.

46. A hydrometallurgical process as defined by claim 44 wherein a portion of the thiosulfate lixiviant solution6 pregnant with extracted precious metal values has at least a portion of said precious metal values recovered therefrom and is then recirculated through said static heap.

* * * * *